United States Patent [19]

Buseth

[11] Patent Number: 4,699,387
[45] Date of Patent: Oct. 13, 1987

[54] SEALING MEANS WITH CENTRAL ELASTOMERIC MEMBER

[75] Inventor: Richard A. Buseth, Jackson, Mich.

[73] Assignee: Snap-Tite, Inc., Union City, Pa.

[21] Appl. No.: 908,275

[22] Filed: Sep. 17, 1986

[51] Int. Cl.$^4$ ............................................. F16J 15/18
[52] U.S. Cl. ............................... 277/167.5; 277/171; 277/228
[58] Field of Search ............. 277/167.5, 168, 170–172, 277/227, 180, 228

[56] References Cited

U.S. PATENT DOCUMENTS

| | | | |
|---|---|---|---|
| 2,200,151 | 5/1940 | Burkhardt | 277/167.5 X |
| 2,739,855 | 3/1956 | Bruning | 309/23 |
| 2,767,768 | 10/1956 | Jelinek | 277/228 X |
| 3,279,805 | 10/1966 | Quinson | 277/180 X |
| 3,510,140 | 5/1970 | Hermann | 277/205 |
| 4,406,467 | 9/1983 | Burger et al. | |

FOREIGN PATENT DOCUMENTS

| | | | |
|---|---|---|---|
| 246763 | 10/1947 | Switzerland | 277/167.5 |
| 701614 | 12/1953 | United Kingdom | 277/180 |

OTHER PUBLICATIONS

Advertisement from *Aerospace Engineering*, date unknown, p. 34, for Greene, Tweed & Co.
P. 19, *Mechanical Engineering*, May, 1986.
Shamban Standard Aerospace Part Number Quick Reference Guide, 13 pages, 1984.
Microdot PolySeal advertisement, source unknown.
Microdot PolySeal brochure, 6 pages.
Chapter 13 of NASA SP–5019, Contributions to Advanced Valve Technology: A Survey, pp. 133–141, author and date unknown.

*Primary Examiner*—Robert S. Ward
*Attorney, Agent, or Firm*—Woodling, Krost & Rust

[57] ABSTRACT

A three-member compound sealing means having a central elastomeric O-ring actuating plastic surrounding members on both sides. Primary seals are formed by the plastic members. These seals lie on both sides of the secondary seals formed by the elastomeric O-ring, thus protecting the O-ring from the corrosive effects of chemicals.

5 Claims, 2 Drawing Figures

SEALING MEANS WITH CENTRAL ELASTOMERIC MEMBER

This invention relates to pressure sealing means for fluid-containing systems. In particular it relates to pressure sealing means for use between two surfaces movable with respect to each other.

BACKGROUND AND SUMMARY OF THE INVENTION

A need exists for superior sealing devices between sliding metal surfaces sealing fluid-containing compartments, especially when one or more of the fluids is corrosive or at an extreme temperature.

The typical sealing arrangement comprises a recess or groove in at least one of the surfaces, which recess is fitted with one or more separate sealing members adapted to be urged simultaneously against both surfaces desired to be sealed. When the surfaces slide with respect to each other, a sealing member contacting both surfaces must necessarily be exposed to sliding friction at its points of contact on at least one of the surfaces, yet the sealing function must not be impaired substantially.

Probably the most well-known seal of the type described is the elastomeric O-ring, so called because it is a ring of round cross-section. It is designed to fit in an annular groove in one of two mating cylindrical surfaces. It is deformable by pressure, and is made with inner and outer diameter such that it is substantially deformed by being squeezed between the groove in one surface and the mating surface. This arrangement provides for good sealing; however, the elastomeric materials in common use tend to be degraded by friction and corrosive chemicals. Further, most lose their desired physical properties when exposed to temperature extremes. If, instead, a seal is made of a relatively non-deformable material such as metal or synthetic resins, it may have superior resistance to friction and corrosion. However, it ordinarily lacks the ability to be urged into a tight contact over a surface area large enough to seal adequately, because of its relative non-deformability.

It has therefore been known to employ sealing systems which combine seals of both types of materials. See, for example, U.S. Pat. No. 2,739,855. In such systems, an elastomeric member is commonly used to provide the force which presses another material against the surfaces to be sealed.

The seal of the present invention is one such system. The seal combination is of the elastomer energized plastic type, in which the plastic is preferably PTFE (polytetrafluoroethylene). That is, it uses an elastomer to urge PTFE against a seal surface. In this way the low friction of PTFE can be employed to advantage, even though by itself PTFE lacks the elasticity to seal well. Such seals are known in the art. My preferred seal, however, enjoys certain advantages over prior seals. It is composed of two separate plastic rings and an elastomeric O-ring.

The plastic rings are shaped so as to partially surround the O-ring, which is sandwiched in between them. The plastic rings are provided with cantilevered lips which seal the surfaces on both sides of an additional seal provided by the O-ring.

This design makes possible the use of a standard O-ring, which is exposed only as a secondary seal to corrosive liquids. The three individual seal points on each side provide excellent protection from leakage. Moreover, the sandwiched arrangement permits the entrapment of lubricant which may be desired to be applied to the O-ring.

Accordingly, it is an object of the invention to provide improved means for sealing two cylindrical surfaces movable with respect to one another.

A further object of the invention is to provide such sealing means which remains effective under corrosive conditions.

These objects and others will be best understood by the claims appended hereto, and by the description hereunder of a preferred embodiment, together with the drawings, in which FIG. 1 is a cut-away view of the seal of the invention, and FIG. 2 is a cross-sectional view of a preferred embodiment of the invention while in operation.

DESCRIPTION OF A PREFERRED EMBODIMENT OF THE INVENTION

Figure 1:
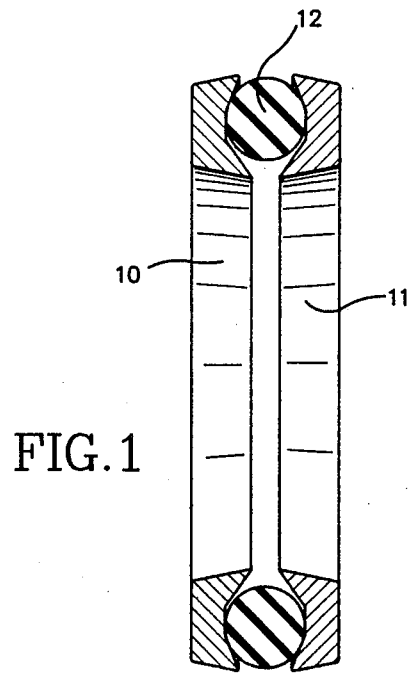

In FIG. 1 the seal combination is seen prior to its use. Plastic (preferably PTFE) rings 10 and 11 are located on both sides of elastomeric O-ring 12. The necessary shape of rings 10 and 11 is seen more clearly in FIG. 2, which shows all three rings under compression during their use.

Plastic rings 10 and 11, as seen, partially surround O-ring 12 which is sandwiched in between them. Areas 20, 21, 22 and 23 along their inner walls are located to impinge upon and slightly compress O-ring 12 so that it exerts a force normal to those walls urging lips 24, 25, 26 and 27, respectively, outward. Lips 24 and 25 form a double PTFE seal on the static seal side and lips 26 and 27 form a similar double dynamic seal. Between the two PTFE seals on each side is a secondary seal provided by O-ring 12.

Figure 2:
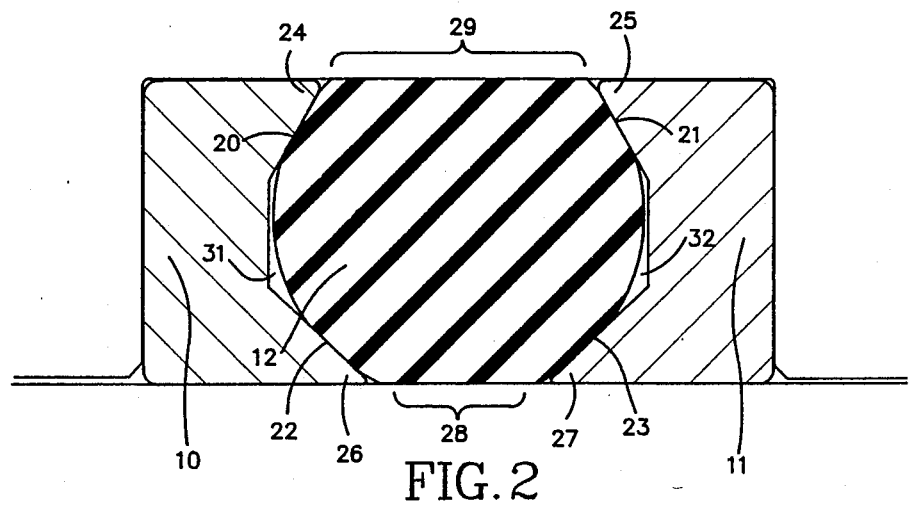

When sealing members 10, 11 and 12 are dimensioned approximately as shown in FIG. 2, the contact area 28 of O-ring 12 on the dynamic sealing surface, and thus the friction, is relatively small; it may be desired to make the contact area 29 larger on the static sealing surface, as shown, to prevent rotation of O-ring 12. This is accomplished by the asymmetry of lips 24 and 26 and of lips 25 and 27.

In an alternative embodiment, not shown, the PTFE elements are bilaterally symmetrical in cross-section, that is, opposed lips 24 and 26, as well as 25 and 27, are the same size and are mirror images of each other. An advantage of this design is that the PTFE elements on each side are then identical, rather than being right and left mirror images; thus only one such type of element need be manufactured.

Should it be advisable to provide a lubricant for the O-ring 12, spaces 31 and 32, between it and the PTFE elements on either side, form natural reservoirs for such lubricant.

The elastomeric material used in the O-ring may be one of many known to those skilled in the art, such as nitrile, ethylene propylene, viton, silicone, fluorosilicone and butyl. The plastic may be PTFE or another plastic having substantially less elasticity than the O-rings. Both materials will be chosen as known to those skilled in the art according to the particular physical and chemical circumstances of the given application.

The invention has been described in detail with particular emphasis on the preferred embodiments thereof, but it should be understood that variations and modifications within the spirit and scope of the invention may occur to those skilled in the art to which the invention pertains.

What is claimed is:

1. An improved seal comprising a first, a second and a third member, said second member being disposed between said first and third members, said second member urging first portions of said first member and said second member into sealing contact with a first surface at first and second points, respectively, said second member urging second portions of said first member and said second member into sealing contact with a second surface at third and fourth points, respectively, and said second member being in sealing contact with said first surface at a fifth point between said first and second points and being in sealing contact with said second surface at a sixth point between said third and fourth points.

2. An improved seal for sealing a cylindrical outer wall against a cylindrical inner wall, a first one of said walls having an annular groove therein, said groove having a back wall and said groove being juxtaposed to the second one of said walls, said seal comprising, an elastomeric O-ring of dimensions adapted to be contained in said groove;

a first and a second plastic ring, each adapted to be contained in said groove such that said first and second PTFE rings are disposed one on each side of said O-ring;

each of said first and second plastic rings having first and second lip means in contact with said O-ring, each of said lip means being urged away from said O-ring as a result of said contact, each said first lip means being pressed thereby into sealing contact with said back wall of said groove and each of said second lip means being pressed thereby into sealing contact with said second wall; and said O-ring being pressed into sealing contact with said back wall between said first lip means and being pressed into sealing contact with said second wall between said second lip means.

3. The improved seal of claim 2 and further comprising wall means on at least one side of said O-ring, said wall means defining a closed chamber between said O-ring and said plastic ring on said side, which closed chamber may contain a lubricant for said O-ring.

4. The improved seal of claim 2 and in which said O-ring is pressed into sealing contact with said back wall over a substantially greater area than that over which said O-ring is pressed into sealing contact with said second wall.

5. The improved seal of claim 2 and in which said first and second plastic rings are identical in shape.

* * * * *